Patented June 4, 1929

1,716,279

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

PORTABLE MITERING MACHINE.

Application filed March 14, 1927. Serial No. 175,386.

Figure 1:
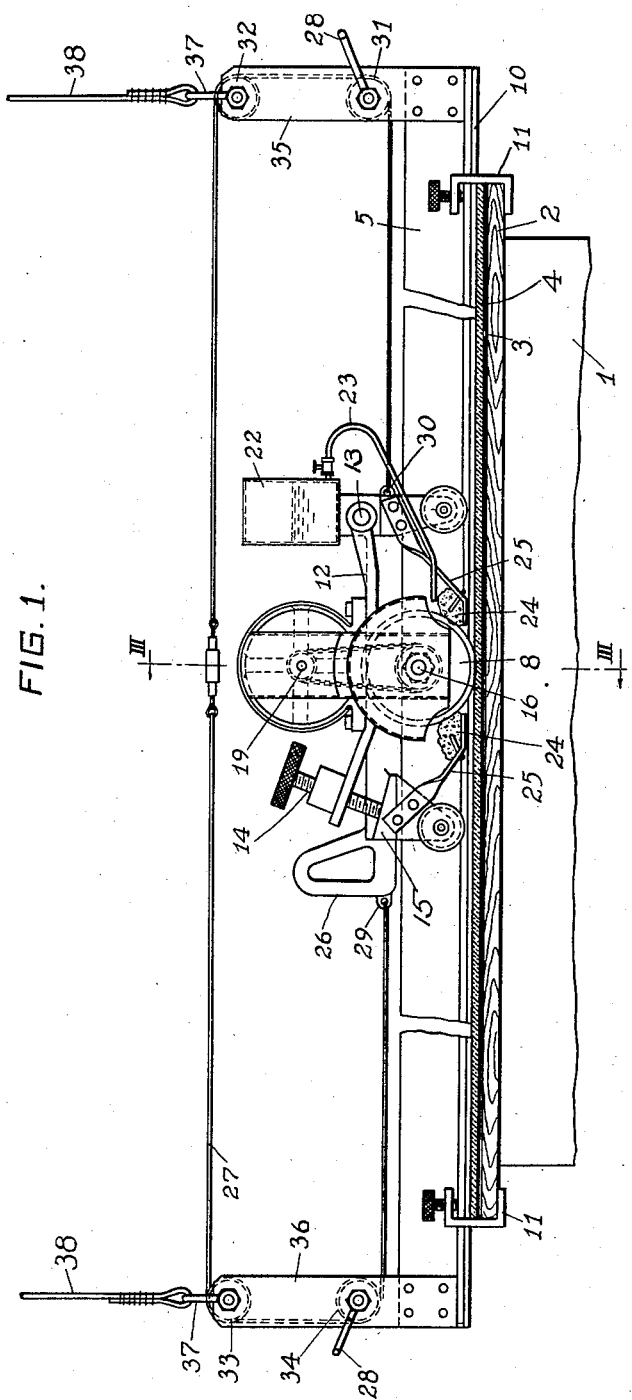
Figure 2:
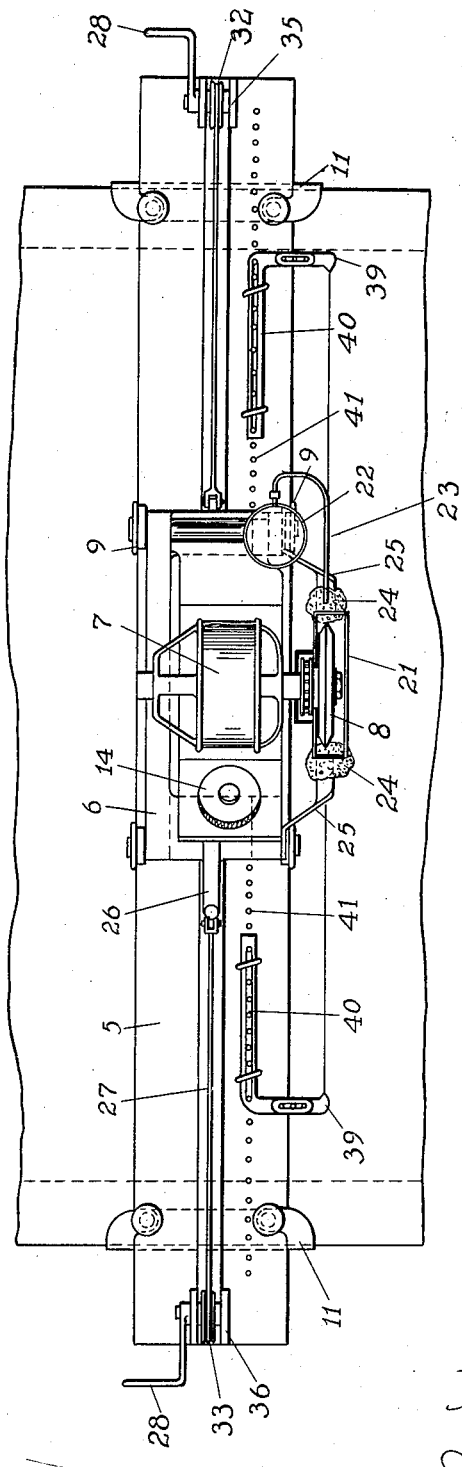
Figure 3:
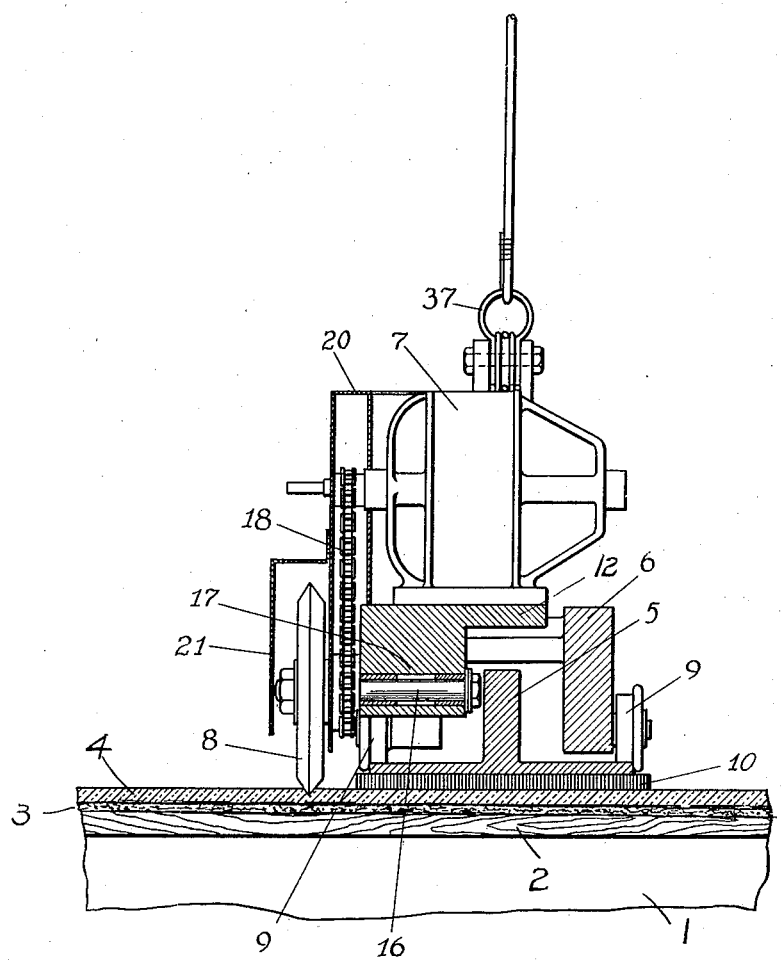

The invention relates to portable mitering machines for cutting the so-called miters or grooves in the surface of glass or other hard sheet material, which it is desired to ornament. Heretofore it has been the practice to do this work by the use of a reciprocating table upon which the sheets were clamped and which carried the edge of the glass to be ornamented along the cutting wheel, ordinarily located below the sheet and suitably driven. This apparatus is cumbersome and expensive, and the adjustment of either the table or the wheel to new cutting positions, where several miters or grooves are to be cut, is a relatively slow matter, due to position of the wheel below the glass and to the requirement for accuracy in the adjustment. The present invention is designed to provide light portable apparatus, which can be seated directly upon the glass to be grooved without any requirement for a special table; which can be used to advantage on small sheets as well as very large ones; and which can be very easily and rapidly adjusted from one cutting position to another, when a plurality of grooves are to be cut on the same sheet. The cutting is done on the upper side of the glass, so that the operator can see the relation of the wheel to the glass and to other grooves and observe the character of the cut as the cutter progresses along the work. The machine has a large field of use where the amount of work to be done is not sufficient to warrant the installation of the relatively large expensive mitering machines of the type heretofore referred to. One embodiment of the invention is illustrated in the accompanying drawings, wherein:

Figure 1 is a side elevation of the machine in position for use upon a glass sheet. Fig. 2 is a plan view. And Fig. 3 is a section on the line III—III of Fig. 1.

Referring to the drawings, 1 is a table, having its top 2 covered with felt sheet 3 for supporting the glass sheet 4 which is to be mitered or cut. The mitering machine comprises the longitudinally extending guide frame 5, preferably of the cross section of an inverted T as indicated in Fig. 3, upon which is mounted a carriage 6 supporting a motor 7 and a mitering wheel 8 driven therefrom.

The carriage 6 is mounted on the four wheels 9, which are flanged (Fig. 3) and have such flanges extending down past the side edges of the bottom plate of the guide frame 5, so that such guide frame acts as a track so that the carriage is held to a right line movement as it travels back and forth along the frame. The lower side of the guide frame 5 has secured thereto (by cement or otherwise) a sheet of yielding material 10, such as rubber, so that injury to the surface of the glass is avoided and the frame is more securely held against slippage than would otherwise be the case. Clamps 11 are shown for securing the machine against movement on the glass sheet during the cutting operation, but it is quite possible to use the machine without the clamps, the weight of the machine and the rubber facing 10 being sufficient to hold the machine against movement under ordinary circumstances.

Mounted for vertical movement on the carriage is the arm or plate 12, such plate being pivoted at one end on the shaft 13 and having at its other end the adjusting screw 14, bearing against a lug 15 on the carriage. This provides a means for adjusting the depth of cut of the grooving or mitering wheel 8, such wheel being carried by the axle 16 journalled in the bearing 17 on the lower side of the arm 12. The motor 7 is also mounted on the arm 12 and drives the wheel 8 through the intermediary of the sprocket chain 18 extending around suitable sprockets on the motor shaft 19 and the shaft 16.

The cutting wheel 8 and sprocket drives are surrounded by suitable casings 20 and 21, and water is supplied to the wheel from the tank 22 supported upon the end of the carriage by means of the pipe 23 leading into the casing 21. Sponges 24, 24 engaging the edge of the wheel and supported by the brackets 25, 25 assist in making the supply of water effective to moisten the wheel and prevent the escape of water.

The carriage may be moved along the guide frame by the handle 26, or this may be accomplished from either end of the frame by means of the cable 27 and cranks 28, 28. The cable is secured to the carriage at the points 29 and 30, and passes around the pulleys 31, 32, 33 and 34 carried by the brackets 35 and 36, the pulleys 31 and 34 being secured to the axles of the cranks 28, 28. A pair of eyes 37, 37 is also provided upon the brackets 35 and 36 for engagement by the depending cables 38, 38 in case it is desired to move the machine by means of an overhead crane.

In order to more easily position the machine with respect to the line of cut, which is to be made, the gauges shown in Fig. 2 are employed. These gauges each comprises a pointer arm 39 mounted for adjustment in and out with respect to the bars 40, 40. The pointer arms are slotted and held with thumb screws to permit of the desired adjustment to bring the pointers into alinement with the edge of the wheel 8. The bars 40, 40 are slotted longitudinally, and held by thumb screws engaging the threaded openings 41 in the guide frame 5 so that the bars may be adjusted longitudinally of the guide frame.

What I claim is:

1. The combination with a table adapted to carry the sheet to be grooved or mitered, of a guide frame seated upon the sheet, means for clamping the guide frame to the table, a carriage mounted for guided movement along the frame, a motor and mitering wheel driven from the motor upon the carriage, means for adjusting the wheel up and down with respect to the sheet, and means operable from the end of the frame for moving the carriage back and forth.

2. The combination with a table adapted to carry the sheet to be grooved or mitered, of a guide frame seated upon the sheet, means for clamping the guide frame to the table, a carriage mounted for guided movement along the frame, a supporting arm mounted on the carriage for vertical adjustment, means for holding the arm in adjusted position, and a mitering wheel and motor in driving engagement therewith carried by the arm.

3. In combination in a portable mitering machine, an elongated guide frame provided on its lower side with a sheet of resilient material for engaging the upper surface of the sheet to be mitered, a carriage mounted on said frame for movement longitudinally thereof, a motor and a mitering wheel driven thereby mounted on the carriage for vertical adjustment, and means operable from the end of the frame for moving the carriage back and forth along the guide frame.

In testimony whereof, I have hereunto subscribed my name this 15 day of Feb., 1927.

WILLIAM OWEN.